(12) United States Patent

Kopit et al.

(10) Patent No.: US 12,663,605 B2

(45) Date of Patent: Jun. 23, 2026

(54) OPTICAL LENS HEATING SYSTEM AND METHOD

(71) Applicant: Celestron Acquisition, LLC, Torrance, CA (US)

(72) Inventors: Eric J. Kopit, Redondo Beach, CA (US); Corey Lee, Ranchos Palos Verdes, CA (US); Joseph Garrison, Orange, CA (US); Daniel Goodwin, Lakewood, CA (US); Derik DeVecchio, Torrance, CA (US); Kunal Bhadane, Pune (IN)

(73) Assignee: Celestron Acquisition, LLC, Torrance, CA (US)

( * ) Notice: Subject to any disclaimer, the term of this patent is extended or adjusted under 35 U.S.C. 154(b) by 638 days.

(21) Appl. No.: 17/992,853

(22) Filed: Nov. 22, 2022

(65) Prior Publication Data

US 2024/0168255 A1      May 23, 2024

(51) Int. Cl.
| | |
|---|---|
| *G02B 7/02* | (2021.01) |
| *G01K 1/143* | (2021.01) |
| *G02B 27/00* | (2006.01) |
| *H05B 3/84* | (2006.01) |

(52) U.S. Cl.
CPC ............. *G02B 7/028* (2013.01); *G01K 1/143* (2013.01); *G02B 7/026* (2013.01); *G02B 27/0006* (2013.01); *H05B 3/84* (2013.01)

(58) Field of Classification Search
CPC .......... G02B 7/008; G02B 7/02; G02B 7/021; G02B 7/026; G02B 7/028; G02B 27/00; G02B 27/0006; H05B 3/84; H05B 3/845; H05B 6/00; H05B 6/06; G01K 1/143; G01K 1/14; G01K 1/16
USPC ....... 359/820, 676, 643, 607, 694, 511–513; 396/97, 448, 529
See application file for complete search history.

(56) References Cited

U.S. PATENT DOCUMENTS

| | | | |
|---|---|---|---|
| 2019/0033690 A1* | 1/2019 | Choi .................. | G02B 27/0006 |
| 2019/0208577 A1* | 7/2019 | Chien .................. | G03B 17/55 |
| 2020/0204712 A1* | 6/2020 | Kim ........................ | G02B 7/021 |
| 2021/0302807 A1* | 9/2021 | Hein ........................ | G03B 30/00 |
| 2022/0163751 A1* | 5/2022 | Park ........................ | G03B 17/55 |

* cited by examiner

*Primary Examiner* — Jie Lei
(74) *Attorney, Agent, or Firm* — Raubvogel Law Office

(57) ABSTRACT

A system for heating a lens of an optical device may include a mounting surface configured to be mounted on the lens with the mounting surface facing the lens, and a heating element that, with the mounting surface mounted on the lens, is proximate the lens such that heat generated by the heating element prevents dew formation on the lens.

20 Claims, 8 Drawing Sheets

OPTICAL LENS HEATING SYSTEM AND METHOD

TECHNICAL FIELD

The present document relates to systems and methods for preventing dew formation on a lens of an optical device so as to allow unobstructed image capture through the optical device.

BACKGROUND

Many people enjoy viewing objects through optical devices made for distant viewing, such as telescopes, binoculars, and the like. Such optical devices can make it possible to view distant objects as though they were much closer to the user's position, and thus are often used in outdoor environments. When viewing celestial objects, viewing typically occurs at night.

Dew formation on the exterior of a skyward facing lens is a problem commonly experienced by astronomical telescope users due to radiative cooling. Since the lens is exposed and facing the night sky, radiative cooling can rapidly cause the temperature of the lens to drop below the ambient dew point temperature; as a result, dew often forms on the surface of the lens. This is particularly problematic with telescope designs that utilize a lens at the front end of the scope, such as a refractor, Schmidt-Cassegrain, or Maksutov-Cassegrain telescope. Once dew forms on the lens, the optics of the system are typically degraded to an extent that makes further viewing impossible.

SUMMARY

The present disclosure describes an optical lens heating system and method for heating a lens of an optical device. Although this description is focused on the skyward-facing lens of a telescope, those of skill in the art will readily recognize that the features and steps described herein can be readily applied to different lenses and/or optical devices.

In some embodiments, a system for heating a lens of an optical device may include a mounting surface configured to be mounted on the lens with the mounting surface facing the lens, and a heating element that, with the mounting surface mounted on the lens, is proximate the lens such that heat generated by the heating element prevents dew formation on the lens.

The mounting surface may be ring-shaped and may define a central aperture through which light can pass to reach the lens.

The mounting surface may be incorporated into a lens retaining ring that keeps the lens in position relative to a body of the optical device such that the heating element does not occlude the central aperture.

The system may further include electrical wiring coupled to the heating element to convey electrical energy to the heating element, and a wire storage unit secured relative to the mounting surface, wherein the wire storage unit is configured to retain the electrical wiring such that the electrical wiring does not occlude the central aperture and does not interfere with attachment of a cover to a body of the optical device to cover the lens.

The system may further include electrical wiring coupled to the heating element to convey electrical energy to the heating element, and a wire management unit configured to be coupled to a body of the optical device to facilitate routing of the electrical wiring to a power source.

The system may further include a temperature sensor secured relative to the mounting surface such that, with the mounting surface mounted on the lens, the temperature sensor is positioned on the lens such that the temperature sensor does not occlude the central aperture and provides sensor data indicative of a temperature of the lens.

The system may further include electrical wiring coupled to the temperature sensor to convey the sensor data to a controller, and a wire storage unit secured relative to the mounting surface, wherein the wire storage unit is configured to retain the electrical wiring such that the electrical wiring does not occlude the central aperture and does not interfere with attachment of a cover to a body of the optical device to cover the lens.

The system may further include a controller configured to receive the sensor data.

The system may further include a power source operatively connected to the controller such that the heating element is automatically powered to heat the lens in response to indication, by the sensor data, that a temperature of the lens is below a predetermined threshold.

In some embodiments, a system for heating a lens of an optical device may include a mounting surface configured to be mounted to a body of the optical device such that the system does not interfere with attachment of a cover to the body to cover the lens and, with the cover attached, the mounting surface is between the cover and the lens, and a heating element that, with the mounting surface mounted to the body, is proximate the lens such that heat generated by the heating element prevents dew formation on the lens.

The mounting surface may be ring-shaped and may define a central aperture through which light can pass to reach the lens. The mounting surface may be incorporated into a lens retaining ring that keeps the lens in position relative to a body of the optical device such that the heating element does not occlude the central aperture.

The system may further include electrical wiring coupled to the heating element to convey electrical energy to the heating element, and a wire storage unit secured relative to the mounting surface, wherein the wire storage unit is configured to retain the electrical wiring such that the electrical wiring does not occlude the central aperture and does not interfere with attachment of the cover to the body to cover the lens.

The system may further include electrical wiring coupled to the heating element to convey electrical energy to the heating element, and a wire management unit configured to be coupled to a body of the optical device to facilitate routing of the electrical wiring to a power source.

The system may further include a temperature sensor secured relative to the mounting surface such that, with the mounting surface mounted on the lens, the temperature sensor is positioned on the lens such that the temperature sensor does not occlude the central aperture and provides sensor data indicative of a temperature of the lens.

The system may further include a controller configured to receive the sensor data, and a power source operatively connected to the controller such that the heating element is automatically powered to heat the lens in response to indication, by the sensor data, that a temperature of the lens is below a predetermined threshold.

According to some embodiments, a system for heating a lens of an optical device may include a mounting surface configured to be mounted on the lens, a heating element that, with the mounting surface mounted on the lens, is proximate the lens such that heat generated by the heating element prevents dew formation on the lens, and a temperature sensor secured relative to the mounting surface such that, with the mounting surface mounted on the lens, the temperature sensor is positioned on the lens such that the temperature sensor does not occlude the central aperture and provides sensor data indicative of a temperature of the lens.

The mounting surface may be ring-shaped and may define a central aperture through which light can pass to reach the lens. The mounting surface may be incorporated into a lens retaining ring that keeps the lens in position relative to a body of the optical device such that the heating element does not occlude the central aperture.

The system may further include first electrical wiring coupled to the heating element to convey electrical energy to the heating element, second electrical wiring coupled to the temperature sensor to convey the sensor data to a controller, and a wire storage unit secured relative to the mounting surface. The wire storage unit may be configured to retain the first electrical wiring and the second electrical wiring such that the first electrical wiring and the second electrical wiring do not occlude the central aperture and do not interfere with attachment of a cover to a body of the optical device to cover the lens.

The system may further include first electrical wiring coupled to the heating element to convey electrical energy to the heating element, second electrical wiring coupled to the temperature sensor to convey the sensor data to a controller, and a wire management unit configured to be coupled to a body of the optical device to facilitate routing of the electrical wiring to a power source.

The system may further include a controller configured to receive the sensor data, and a power source operatively connected to the controller such that the heating element is automatically powered to heat the lens in response to indication, by the sensor data, that a temperature of the lens is below a predetermined threshold.

According to some embodiments, a method for heating a lens of an optical device may include mounting an optical lens heating system on the lens, and, with the optical lens heating system mounted on the lens, generating heat with a heating element of the optical lens heating system such that the heat prevents dew formation on the lens.

The optical lens heating system may include a ring that defines a central aperture through which light can pass to reach the lens.

The ring may be a lens retaining ring. Mounting the optical lens heating system on the lens may include, with the ring, keeping the lens in position relative to a body of the optical device.

The method may further include conveying electrical energy to the heating element with electrical wiring coupled to the heating element, and, with a wire storage unit of the optical lens heating system, retaining the electrical wiring such that the electrical wiring does not occlude the central aperture and does not interfere with attachment of a cover to a body of the optical device to cover the lens.

The method may further include conveying electrical energy to the heating element with electrical wiring coupled to the heating element, and coupling a wire management unit to a body of the optical device to facilitate routing of the electrical wiring to a power source.

The optical lens heating system may further include a temperature sensor positioned such that mounting the optical lens heating system on the lens includes positioning the temperature sensor on the lens such that the temperature sensor provides sensor data indicative of a temperature of the lens.

The method may further include conveying the sensor data to a controller with electrical wiring coupled to the temperature sensor, and, with a wire storage unit of the optical lens heating system, retaining the electrical wiring such that the electrical wiring does not occlude the central aperture and does not interfere with attachment of a cover to a body of the optical device to cover the lens.

The method may further include receiving the sensor data in a controller.

The method may further include operatively connecting a power source to the controller such that the power source is automatically activated to cause the heating element to heat the lens in response to indication, by the sensor data, that a temperature of the lens is below a predetermined threshold.

According to some embodiments, a method for heating a lens of an optical device may include mounting an optical lens heating system to a body of the optical device such that the optical lens heating system does not interfere with attachment of a cover to the body to cover the lens and, with the cover attached, the optical lens heating system is between the cover and the lens. The method may further include, with the optical lens heating system mounted on the lens, generating heat with a heating element of the optical lens heating system such that the heat prevents dew formation on the lens.

The optical lens heating system may include a ring that defines a central aperture through which light can pass to reach the lens. The ring may be a lens retaining ring. Mounting the optical lens heating system on the lens may include, with the ring, keeping the lens in position relative to a body of the optical device.

The method may further include conveying electrical energy to the heating element with electrical wiring coupled to the heating element, and, with a wire storage unit of the optical lens heating system, retaining the electrical wiring such that the electrical wiring does not occlude the central aperture and does not interfere with attachment of a cover to a body of the optical device to cover the lens.

The method may further include conveying electrical energy to the heating element with electrical wiring coupled to the heating element, and coupling a wire management unit to a body of the optical device to facilitate routing of the electrical wiring to a power source.

The optical lens heating system may further include a temperature sensor positioned such that mounting the optical lens heating system on the lens includes positioning the temperature sensor on the lens such that the temperature sensor provides sensor data indicative of a temperature of the lens.

The method may further include receiving the sensor data in a controller, and operatively connecting a power source to the controller such that the power source is automatically activated to cause the heating element to heat the lens in response to indication, by the sensor data, that a temperature of the lens is below a predetermined threshold.

According to some embodiments, a method for heating a lens of an optical device may include mounting an optical lens heating system on the optical device such that a temperature sensor of the optical heating system is positioned on the lens to provide sensor data indicative of a temperature of the lens, and, with the optical lens heating system mounted on the lens, generating heat with a heating element of the optical lens heating system such that the heat prevents dew formation on the lens.

The optical lens heating system may include a ring that defines a central aperture through which light can pass to reach the lens. The ring may be a lens retaining ring.

Mounting the optical lens heating system on the lens may include, with the ring, keeping the lens in position relative to a body of the optical device.

The method may further include conveying electrical energy to the heating element with first electrical wiring coupled to the heating element, conveying the sensor data to a controller with electrical wiring coupled to the temperature sensor, and, with a wire storage unit of the optical lens heating system, retaining the first electrical wiring and the second electrical wiring such that the first electrical wiring and the second electrical wiring do not occlude the central aperture and do not interfere with attachment of a cover to a body of the optical device to cover the lens.

The method may further include conveying electrical energy to the heating element with first electrical wiring coupled to the heating element, and coupling a wire management unit to a body of the optical device to facilitate routing of the electrical wiring to a power source.

The method may further include receiving the sensor data in a controller, and operatively connecting a power source to the controller such that the power source is automatically activated to cause the heating element to heat the lens in response to indication, by the sensor data, that a temperature of the lens is below a predetermined threshold.

BRIEF DESCRIPTION OF THE DRAWINGS

The accompanying drawings illustrate several embodiments. Together with the description, they serve to explain the principles of the embodiments. One skilled in the art will recognize that the particular embodiments illustrated in the drawings are merely exemplary, and are not intended to limit scope.

DETAILED DESCRIPTION

The techniques described herein can be used in connection with any type of optical device, including for example telescopes, spotting scopes, rifle scopes, monoculars, binoculars, and microscopes.

In at least one embodiment, the optical lens heating system may provide heat directly to the lens to prevent dew formation on the exterior of the lens when it is facing skyward, as it would be during astronomical observation. An integrated temperature sensor such as a thermistor may provide a feedback loop to optimize power usage when using the optical lens heating system with an optional controller.

The optical lens heating system may include a ring that replaces the optical device's regular mechanical lens retaining ring, which may be in direct contact with the lens edge. The optical lens heating system may have a heating element such as a heating circuit applied to the side of it that faces the lens. When the ring is installed, the heating element may reside between the ring and the lens, and may make contact with the outer edge of lens, which may be outside the optical path because the edge of the lens would be covered by the retaining ring anyway. When power is applied to the heating element through an integrated power jack, the ring may provide heat to the lens, to prevent dew formation on the lens.

A temperature sensor such as a thermistor may be integrated into the ring. If used with an optional controller, the temperature sensor may provide temperature feedback to the controller for most efficient power usage to keep the lens above the ambient dew point and to prevent overheating. The temperature sensor may reside between the ring and the lens and may be completely behind the ring so as not to obstruct the aperture of the lens. The temperature sensor may be thermally isolated from the heating element and may also be in direct contact with the lens (edge). The ring may have integrated wiring for connecting the heating element and/or the temperature sensor to the controller and/or the power supply.

The optical lens heating system may have advantages over known lens heating systems, including but not limited to:

The ability to heat the lens directly without obstructing the aperture of the lens;

Integration with the optical device after installation, such that the optical lens heating system need not be removed to stow, store, and reuse the optical device; and Placement of a temperature sensor directly on the lens for more accurate temperature measurement and/or control without obstructing the aperture of the lens.

Exemplary System Including Optical and Imaging Devices

Figure 1:
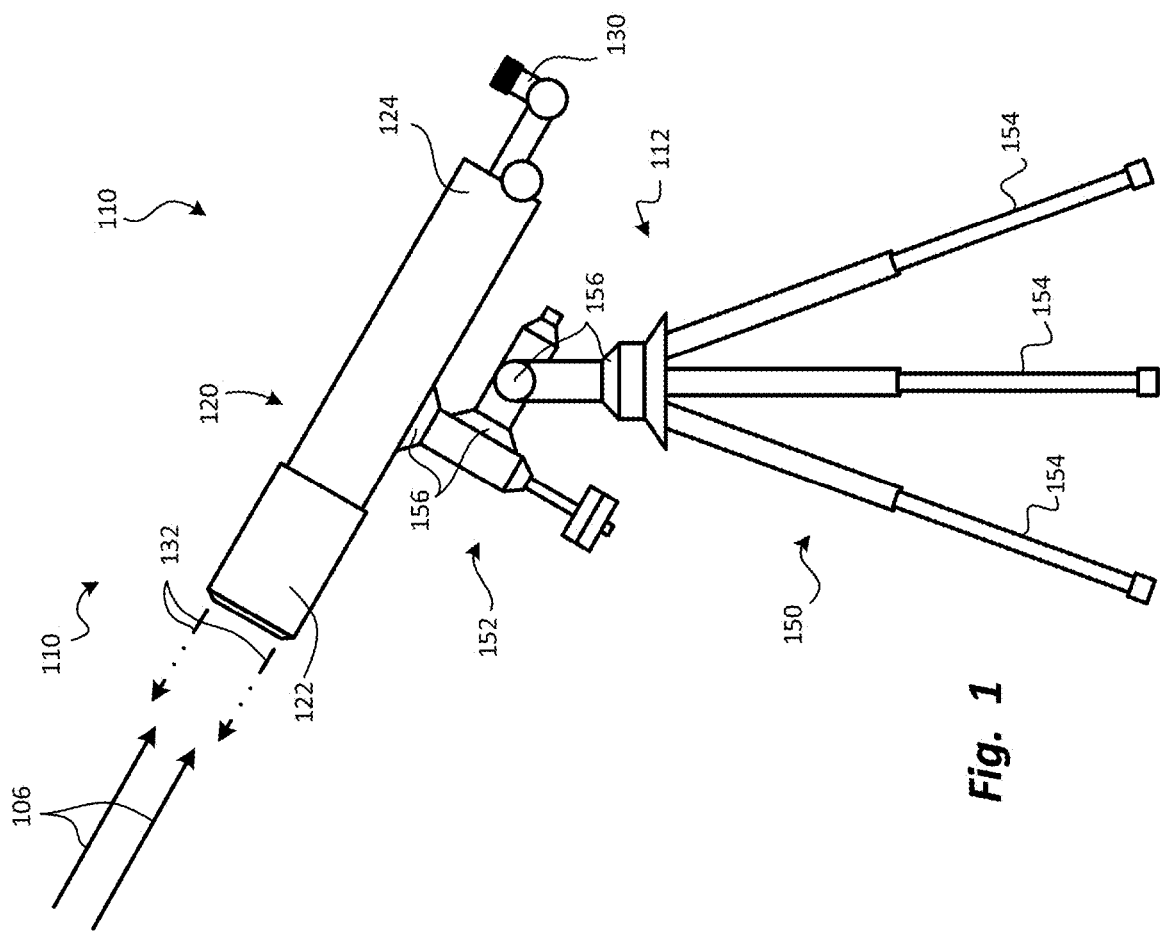
FIG. 1 is a side elevation view of system including an optical device in the form of a telescope, according to one embodiment.

Referring to FIG. 1, a side elevation view depicts an optical device in the form of a telescope 110, according to one embodiment. In this application, an "optical device" may be any device that is designed to direct, capture, or otherwise manipulate light for viewing by a user. Thus, optical devices may include telescopes, binoculars, monoculars, periscopes, cameras, lens attachments, microscopes, and/or any other device that utilizes lenses, mirrors, and/or prisms to manipulate light.

The telescope 110 may receive light 106, which may be extraterrestrial light and/or light from any other source, and may be used to provide the user with a view of the subject. The telescope 110 may, in certain embodiments, be used to view far-away objects, such as extraterrestrial objects. In other embodiments, the telescope 110 may be used to view nearer, terrestrial objects. The telescope 110 may be supported by a support 112 at an orientation suitable for viewing and/or photographing the subject. The support 112 may facilitate orientation of the telescope 110 to point at the subject. In some embodiments, the support 112 may provide two-axis adjustment (for example, azimuth and elevation) of the orientation of the telescope 110.

As shown, the telescope 110 may have a body 120, which may include a generally tubular exterior as shown, or in alternative embodiments, another suitable shape such as a square or rectangular cross-sectional shape. The body 120 may be sized to provide the desired aperture size so that the telescope 110 can capture sufficient light to generate bright, clear images with little vignetting, within a relatively short exposure period.

The body 120 may have an aperture end 122 and a viewing end 124. The aperture end 122 may be oriented toward the subject matter to be viewed and/or imaged. Proximate the viewing end 124, the telescope 110 may have an eyepiece 130 coupled to the viewing end 124 of the body 120. The eyepiece 130 may be designed such that an image of the light 106 captured by the telescope 110 is focused at the eyepiece 130. Thus, the user may view and/or capture the image through the eyepiece 130. The telescope 110 may have a field-of-view 132.

The support 112 may have a base portion 150 and a telescope mounting portion 152. The base portion 150 may provide stable support for the telescope mounting portion 152, and thence, for the telescope 110. Thus, the base portion 150 may have multiple legs 154 that provide such stability. If desired, the legs 154 may be arranged to define a tripod or other known support structure. The telescope mounting portion 152 may have one or more joints 156 that can be adjusted to change the orientation of the telescope 110 relative to the support 112. The telescope mounting portion 152 may have one or more mounting features that mate with and/or are otherwise secured to the telescope 110, for example, via attachment to an accessory mount (not shown) or other support attachment feature of the telescope 110.

The joints 156 may be user-adjustable in a variety of ways. According to some embodiments, the joints 156 may be manually adjusted and fixed in their respective desired orientations with set screws or other fixation devices. In other embodiments, the joints 156 may be motor-driven. Stepper motors and/or other motors that provide fine control and locking capability may be used. Such motors may, if desired, be electronically controlled.

Figure 2:
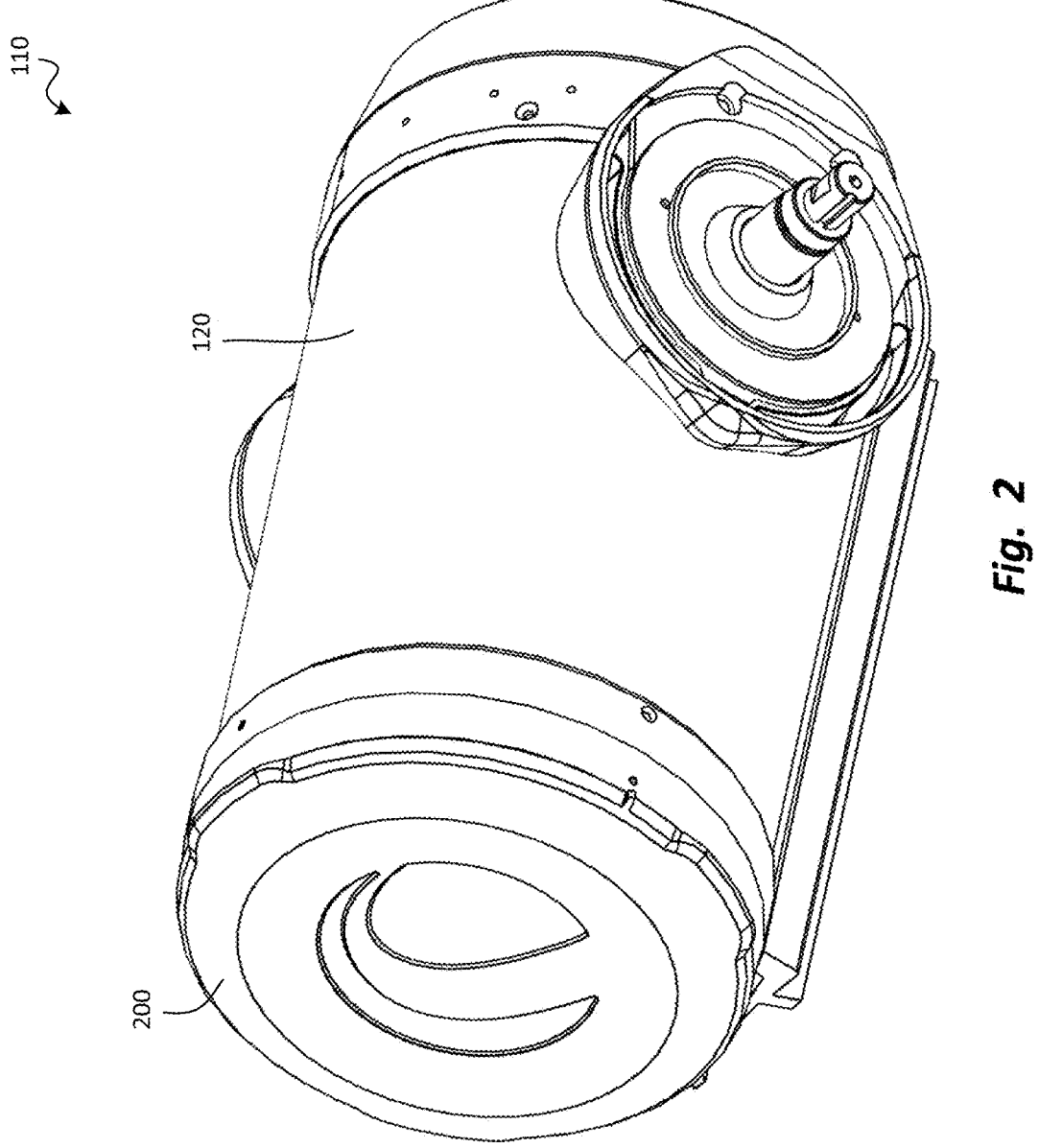
FIG. 2 is a perspective view of the optical device of FIG. 1, with a lens cover attached to the body of the optical device, according to one embodiment.

FIG. 2 is a perspective view of the telescope 110 of FIG. 1 without the support 112, and with a lens cover 200 attached to the body 120 of the telescope 110, according to one embodiment. The lens cover 200 may cover and protect the lens of the telescope 110, which will be shown in FIG. 3.

Figure 3:
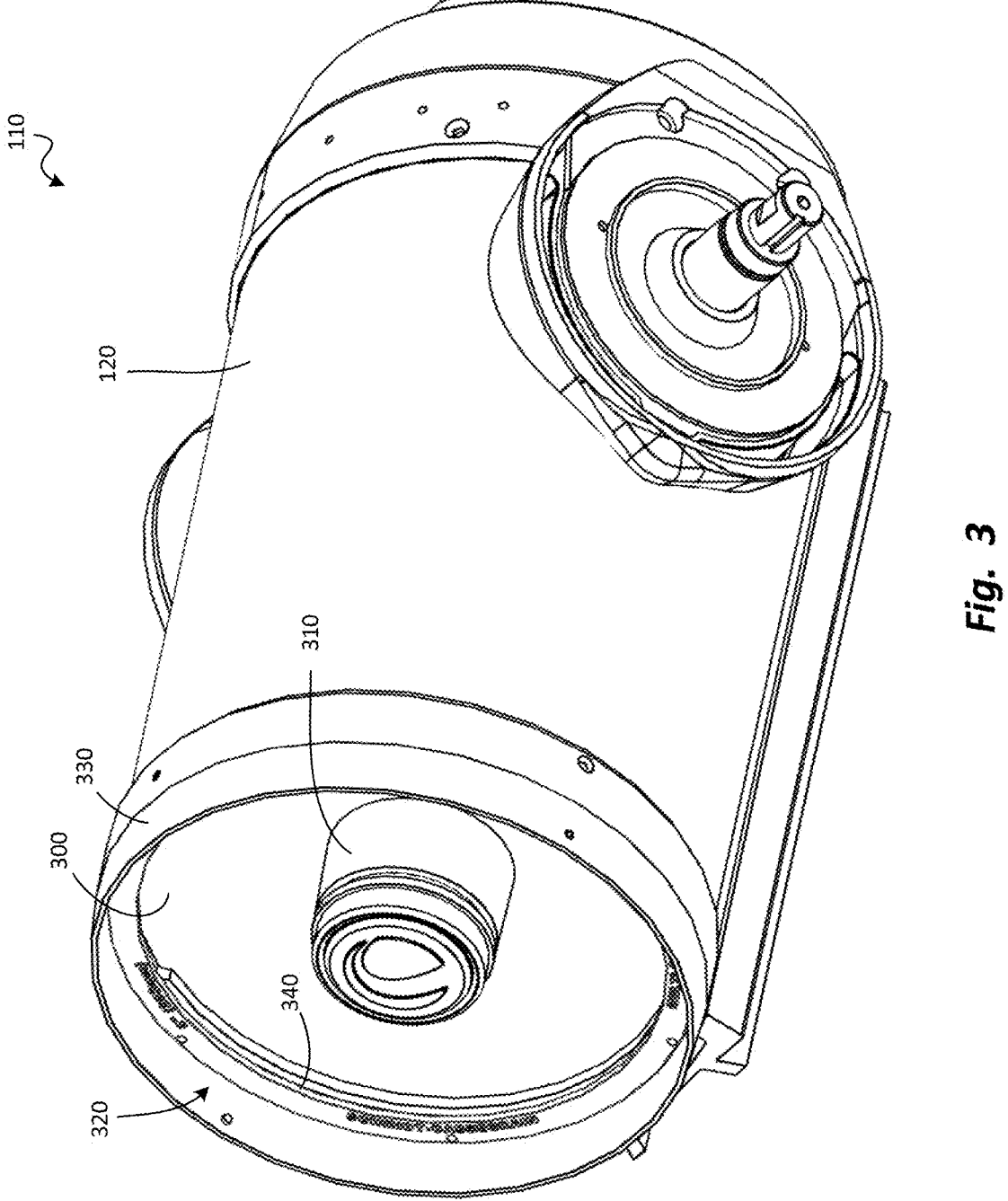
FIG. 3 is a perspective view of the optical device of FIG. 1, with the lens cover removed to reveal a lens retaining ring, according to one embodiment.

FIG. 3 is a perspective view of the telescope 110 of FIG. 1, with the lens cover 200 removed to reveal a lens 300, according to one embodiment. The lens 300 may optionally have an annular shape designed to fit around a secondary obstruction 310 that reflects light, within the body 120 of the telescope 110, to an eyepiece (not shown in FIG. 3), which may extend from the body 120 like the eyepiece 130 of FIG. 1. Those of skill in the art will recognize that the telescope 110 of FIG. 3 is merely exemplary, and an optical lens heating system according to the present disclosure may be used in connection with other optical device types and/or other lens types.

As further shown in FIG. 3, the telescope 110 may have a lens retaining ring 320 that holds the lens 300 in place relative to the body 120. The lens retaining ring 320 may have a ring shape that lies along the periphery of the lens 300 and sandwiches the lens 300 against the body 120. The lens retaining ring 320 may define a central aperture 340 through which light can pass to reach the lens 300, such that the lens retaining ring 320 does not obstruct the view obtained by the telescope 110. The lens retaining ring 320 may be secured to the body 120 through the use of fasteners such as screws (not shown). Such fasteners may pass through holes in the outer periphery of the lens retaining ring 320, just outside the circumference of the lens 300.

The telescope 110 may optionally have a light shield 330 with a generally tubular shape that fits around the lens 300 and the lens retaining ring 320. The light shield 330 may restrict the flow of ambient light into the lens 300, thereby enhancing the clarity of imaging of the subject matter at which the telescope 110 is directed. The light shield 330 may be part of the body 120, or may be a separate element that can be attached to the body 120.

In some embodiments, an optical lens heating system may be placed directly on the lens 300. Advantageously, such an optical lens heating system may transmit heat directly to the lens 300 (or through a thin layer), rather than heating the lens 300 through the body 120. The heat may be transmitted to the lens 300 through a thermally conductive material for better heat transmission and efficiency. The lens 300 may thereby be more evenly and predictably heated, increasing the ability of the optical lens heating system to prevent dew formation on the lens 300, and preventing damage to the body 120 and/or other components of the telescope 110 through overheating.

Yet further, such an optical lens heating system may serve as a lens retaining ring. Thus, the optical lens heating system may be used in place of the lens retaining ring 320, and may serve to secure the lens 300 to the body 120, as well as to heat the lens 300 to prevent dew formation. One such embodiment will be shown and described in connection with FIGS. 4 through 7.

Exemplary Optical Lens Heating System

Figure 4:
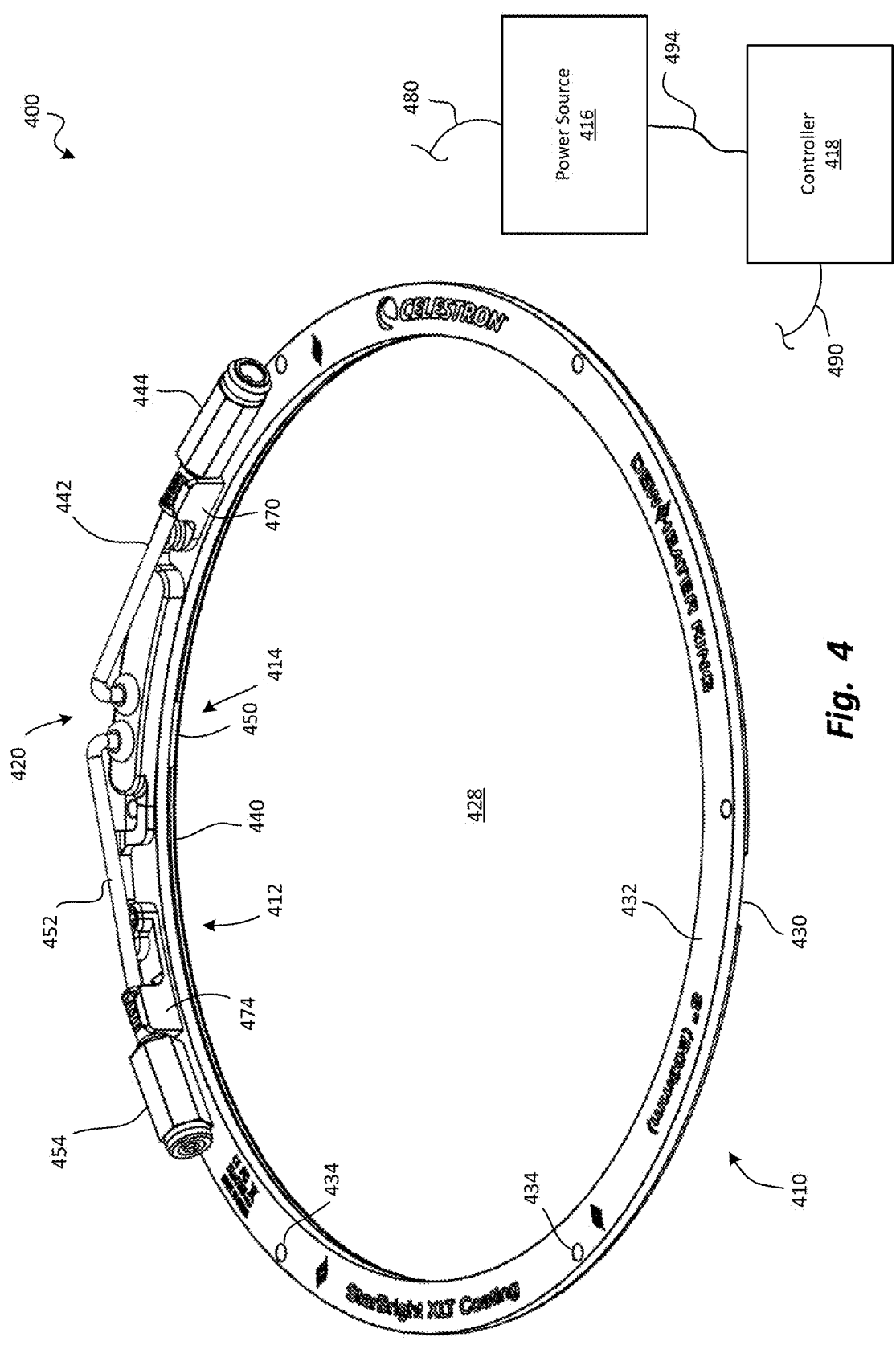
FIG. 4 is a top perspective view of an optical lens heating system according to one embodiment.

FIG. 4 is a top perspective view of an optical lens heating system, or system 400, according to one embodiment. As shown, the system 400 may include a ring 410, a heating element 412, a temperature sensor 414, a power source 416, a controller 418, and a wire storage unit 420.

The ring 410 may act as a replacement for the lens retaining ring 320, and may thus secure the lens 300 to the body 120 of the telescope 110 of FIG. 3. The ring 410 may have a ring shape that defines a central aperture 428, similar to the central aperture 340 of the lens retaining ring 320 of FIG. 3. The central aperture 428 may permit light to enter the lens 300 in a manner similar to that of the lens retaining ring 320.

The ring 410 may have a mounting surface 430 configured to be mounted to the body 120 in a manner that captures the lens 300. Further, the ring 410 may have an outward-facing surface 432 that faces outward (i.e., toward the subject matter being viewed with the telescope 110) when the ring 410 is mounted on the body 120. The ring 410 may include a series of fastener holes 434 through which fasteners (shown in FIG. 6) can be inserted to secure the ring 410 to the body 120.

The ring 410 may be sized to fit within the light shield 330, between the lens 300 and the lens cover 200, so that the ring 410 can remain in place while the telescope 110 is stored. Thus, the ring 410 need not be removed from the telescope 110 and reattached for subsequent use.

The heating element 412 may supply thermal energy to the lens 300 to keep the lens 300 at a minimum temperature, thereby preventing dew formation. The heating element 412 may have a heating ring 440, a power wire 442, and a power jack 444. The heating ring 440 may be electrically operated and may include any type of heating device. According to some embodiments, the heating ring 440 may include a resistive heater with wiring with a resistance level tuned to the overall level of heat dissipation desired. Such wiring may extend around the heating ring 440 according to any known pattern (for example, a simple, single route around the heating ring 440, various zigzag patterns, and/or the like).

In some embodiments, the heating ring 440 may only occupy part of the mounting surface 430 so that the remainder of the mounting surface 430 can rest directly on the body 120 of the telescope 110, to which the ring 410 is to be attached. This may also avoid the need for fasteners to pass through the heating ring 440, as the fasteners may extend through the surface 430, outside the perimeter of the heating ring 440.

The heating ring 440 may have a ring shape with a profile that permits the heating ring 440 to be entirely covered by the ring 410. If desired, the heating ring 440 may be generally flat so that the heating ring 440 does not cause the ring 410 to protrude excessively away from the lens 300. One or both sides of the heating ring 440 may be soft (for example, felt-covered) so that the heating ring 440 can rest directly on the periphery of the lens 300 (in direct contact with the lens 300) without causing damage to the lens 300.

Placement of the heating ring 440 directly on the lens 300 may advantageously provide for more even and predictable heating of the lens 300 particularly when compared with a heating element positioned elsewhere on the telescope 110 (for example, wrapped around the body 120). Further, the ring shape of the heating ring 440 may heat the entire circumference of the lens 300 generally uniformly, with heat transferring to the interior of the lens 300 from the periphery for a relatively even lens temperature.

The power wire 442 may convey electrical power to the heating ring 440, and may thus include multiple (for example, positive and negative) wires. Such wires may be encased in a single sheath for convenience. The power wire 442 may be electrically connected to the power source 416 according to any known method. According to one example, the power wire 442 may terminate in the power jack 444. The power jack 444 may have a hole that receives a pin connector (not shown) electrically connectable to the power source 416.

The temperature sensor 414 may measure the temperature of the lens 300 and provide senor data that provides an indication of the temperature to the user and/or the controller 418. The controller 418 is optional; in some embodiments, the controller 418 may be omitted and the temperature sensor 414 may provide a temperature reading that is only for the user and can be used to manually control operation of the heating element 412 (for example, by manually turning the power source 416 on or off, or manually adjusting the power provided to the heating element 412 by the power source 416).

Further, the temperature sensor 414 is also optional; in some embodiments, the controller 418 and the temperature sensor 414 may both be omitted and the user may manually control the operation of the heating element 412 without the benefit of sensor data, or the heating element 412 may be operated at constant power, with constant heat output, to prevent dew formation on the lens 300. This may consume additional power, which may be a concern if the system 400 is battery-operated. If it is plugged into an A/C power source, this may not be a concern. In the embodiment shown in FIG. 4, the temperature sensor 414 may have a temperature sensing element 450, a temperature sensor wire 452, and a temperature sensor jack 454.

The temperature sensing element 450 may be designed and positioned to measure the temperature of the lens 300 directly, providing an accurate measurement of the temperature of the lens 300, particularly by comparison with placement of the temperature sensing element 450 at a location displaced from the lens 300, in which case the temperature of the lens 300 would have to be measured indirectly (i.e., through one or more other components of the telescope 110).

The temperature sensing element 450 may be any type of temperature sensors, including but not limited to thermocouples, resistance temperature detectors (RTD's), thermistors, semiconductor-based integrated circuits, and/or the like. According to some embodiments and as shown in FIG. 4, the temperature sensing element 450 may be a thermistor with a generally flat, platelike shape that resides between the mounting surface 430 and the lens 300, and potentially between a small sectorial portion of the heating ring 440 and the lens 300. Thus, the temperature sensing element 450 may directly contact the lens 300 and may provide direct measurement of the temperature of the lens 300.

The temperature sensor wire 452 may convey electrical power to the temperature sensing element 450 (if needed) and may convey sensor data from the temperature sensing element 450 to the controller 418 and/or a user output device such as a display (not shown). The temperature sensor wire 452 may include multiple (for example, positive and negative) wires. Such wires may be encased in a single sheath for convenience. The temperature sensor wire 452 may be electrically connected to the controller 418 and/or output device (not shown) according to any known method. According to one example, the temperature sensor wire 452 may terminate in the temperature sensor jack 454. The temperature sensor jack 454 may have a hole that receives a pin connector (not shown) electrically connectable to the controller 418 and/or output device.

The wire storage unit 420 may be secured to the outward-facing surface 432 of the ring 410, and may be designed to capture and/or retain the power wire 442, the power jack 444, the temperature sensor wire 452, and/or the temperature sensor jack 454. As embodied in FIG. 4, the wire storage unit 420 may be configured to capture and retain the power jack 444 and the temperature sensor jack 454, and maintain them in a suitable position for electrical connection to the power source 416 and/or the controller 418, respectively. In some embodiments, the power source 416 may be connected to the heating element 412 through the controller 418 such that the controller 418 receives power from the power source 416 and passes the appropriate level of power to the heating element 412.

The wire storage unit 420 may thus have a power jack receiver 470 configured to receive the power jack 444 and a temperature sensor jack receiver 474 configured to receive the temperature sensor jack 454. The power jack receiver 470 and the temperature sensor jack receiver 474 may have any configuration suitable for retention of electrical components and wiring, including any type of clip, clamp, or other fastening device known in the art.

As shown in FIG. 4, the power jack receiver 470 and the temperature sensor jack receiver 474 may each take the form of a recess formed in the body of the wire storage unit 420, which may be formed of a polymer via a molding process such as injection molding. Each recess may have a clip in the form of an arm that can flex outward to permit placement of the power jack 444 or the temperature sensor jack 454 in the recess, and then snap into place to capture the power jack 444 or the temperature sensor jack 454. The wire storage unit 420 may optionally have labels or other markings to show which of the power jack 444 and the temperature sensor jack 454 is to be placed in each of the power jack receiver 470 and the temperature sensor jack receiver 474.

The power jack receiver 470 and the temperature sensor jack receiver 474 may be positioned such that the power wire 442, the power jack 444, the temperature sensor wire 452, and the temperature sensor jack 454 are all positioned out of the optical pathway of light 106 entering the lens 300, and out of the way of the lens cover 200. Thus, the system 400 need not be removed from the telescope 110 to store the telescope 110, and the power jack 444 and the temperature sensor jack 454 need not be removed from the power jack receiver 470 and the temperature sensor jack receiver 474, respectively, during use of the telescope 110. The power jack receiver 470 and the temperature sensor jack receiver 474 may optionally maintain the power jack 444 and the temperature sensor jack 454 in positions such that they can be accessed and receive connections without removal of the power jack 444 and the temperature sensor jack 454 from the power jack receiver 470 and the temperature sensor jack receiver 474, respectively.

As further shown, the power source 416 may have a power wire 480 that can be connected to the heating element 412 via the power jack 444. Similarly, the controller 418 may have a temperature sensor wire 490 that can be connected to the temperature sensor 414 via the temperature sensor jack 454. As mentioned previously, the power wire 480 and the temperature sensor wire 490 may each have a pin that can be inserted into the corresponding one of the power jack 444 and the temperature sensor jack 454. If desired, these pins may be sized and/or shaped differently in order to prevent connection of the power wire 480 to the temperature sensor jack 454 and/or prevent connection of the temperature sensor wire 490 to the power jack 444.

In alternative embodiments (not shown), the power wire 480 and the temperature sensor wire 490 may have jacks, and corresponding pins may be coupled to the ends of the power wire 442 and the temperature sensor wire 452. In yet other alternative embodiments, different interconnection features may be provided between the power wire 442 and the power wire 480 and/or between the temperature sensor wire 452 and the temperature sensor wire 490. In yet other alternative embodiments, no interconnection may be provided, and the power wire 480 may be connectable (via any known electrical connection method) directly to the heating element 412 and/or the temperature sensor wire 490 may be connectable directly to the temperature sensor 414. In still other alternative embodiments, the power wire 442 may be connectable directly to the power source 416 and/or the temperature sensor wire 452 may be connectable directly to the controller 418.

In yet other alternative embodiments, one or more wireless connections may be used. For example, the temperature sensor 414 may be wirelessly connected to the controller 418 via any known wireless data transmission standard, to wirelessly transmit the sensor data to the controller 418.

The power source 416 may be any known source of electrical power. For example, the power source 416 may contain a battery, a generator, or a connection to a municipal power grid. Similarly, the controller 418 may have any configuration known in the art, and may utilize any hardware and/or software known to provide control of a system. The controller 418 is optional and may be omitted. Where present, the controller 418 may be connected to the temperature sensor 414 and/or other sensors. According to some examples, the controller 418 may be connected to the temperature sensor 414 and to one or more sensors designed to provide data regarding the temperature, humidity, dew point, and/or other data regarding the ambient weather conditions around the telescope 110. In some embodiments, the controller 418 may be connected to a weather data service that provides this information. This connection may be direct (for example, cellular, Wi-Fi, and/or the like), or may be provided through another device such as a smartphone.

The controller 418 may be connected to the power source 416 via wiring 494. Thus, the controller 418 may provide control signals to the controller 418 that control operation of the power source 416, for example, to turn the power source 416 on or off, or to increase or decrease the power supplied to the heating element 412 to increase or decrease the heat imparted to the lens 300, respectively. In alternative embodiments, the controller 418 may be wirelessly connected to the power source 416 to provide wireless control signals.

Figure 5:
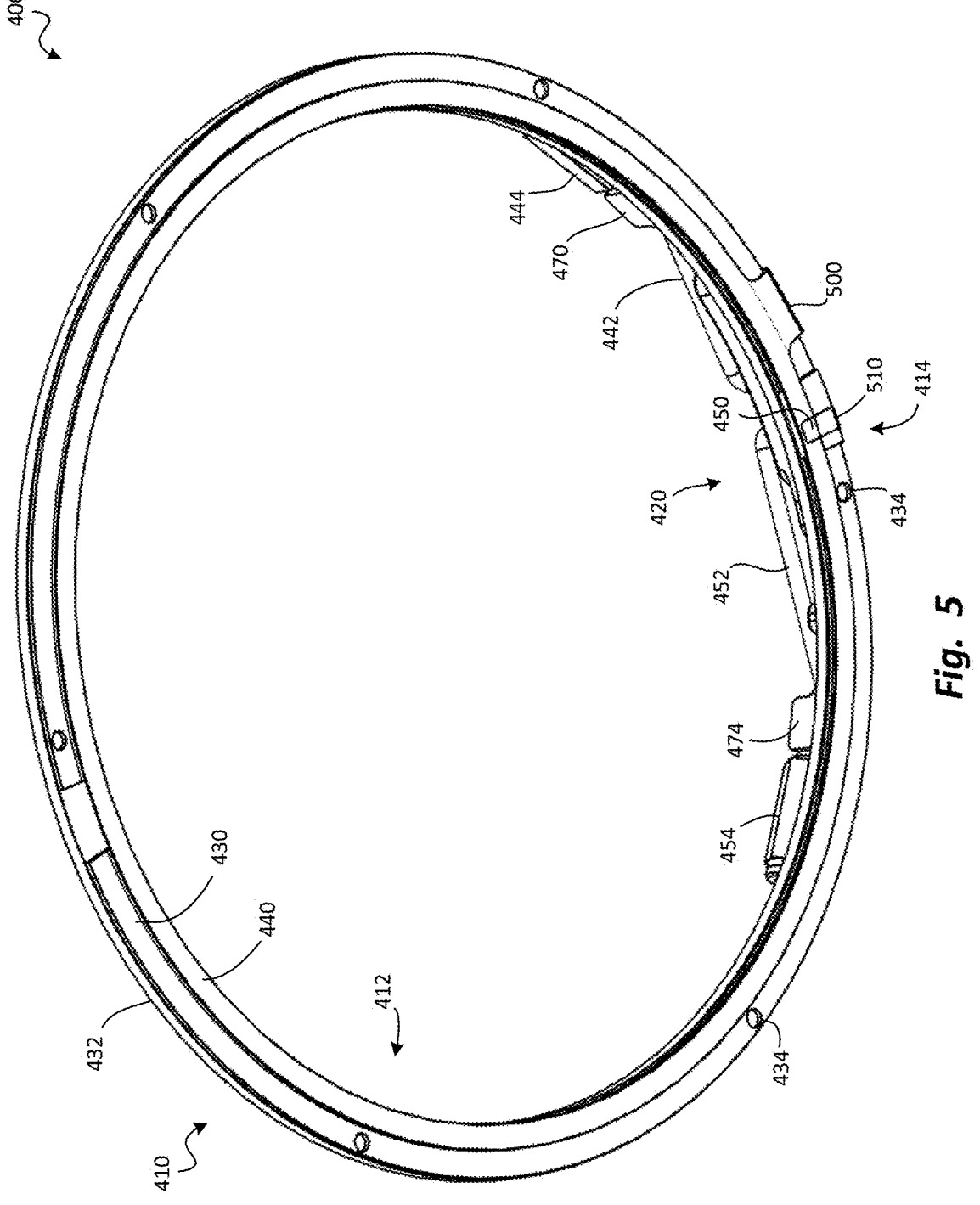
FIG. 5 is a bottom perspective view of the lens heating system of FIG. 4.

FIG. 5 is a bottom perspective view of the lens heating system, or system 400, of FIG. 4. As mentioned previously, the heating ring 440 of the heating element 412 may occupy the inner portion of the mounting surface 430 of the ring 410, while the outer portion of the mounting surface 430 may extend beyond the circumference of the heating ring 440 to directly abut the body 120 of the telescope 110. If desired, the outer portion of the mounting surface 430 may have plateaus, bosses, and/or other features that provide room for the heating ring 440 between the mounting surface 430 and the lens 300, and help avoid excessive compression of the heating ring 440 as the ring 410 is secured to the body 120.

As also shown, the heating element 412 may have a tab 500 that extends from the heating ring 440 around the periphery of the ring 410 and onto the outward-facing surface 432 of the ring 410. The tab 500 may electrically connect the heating ring 440 to the power wire 442, which may extend from the outward-facing surface 432. The tab 500 may be soldered and/or otherwise secured to the power wire 442.

As further shown, the temperature sensor 414 may have a tab 510 that extends from the temperature sensing element 450 around the periphery of the ring 410 and onto the outward-facing surface 432 of the ring 410. The tab 510 may electrically connect the temperature sensing element 450 to the temperature sensor wire 452, which may extend from the outward-facing surface 432. The tab 510 may be soldered and/or otherwise secured to the temperature sensor wire 452.

Figure 6:
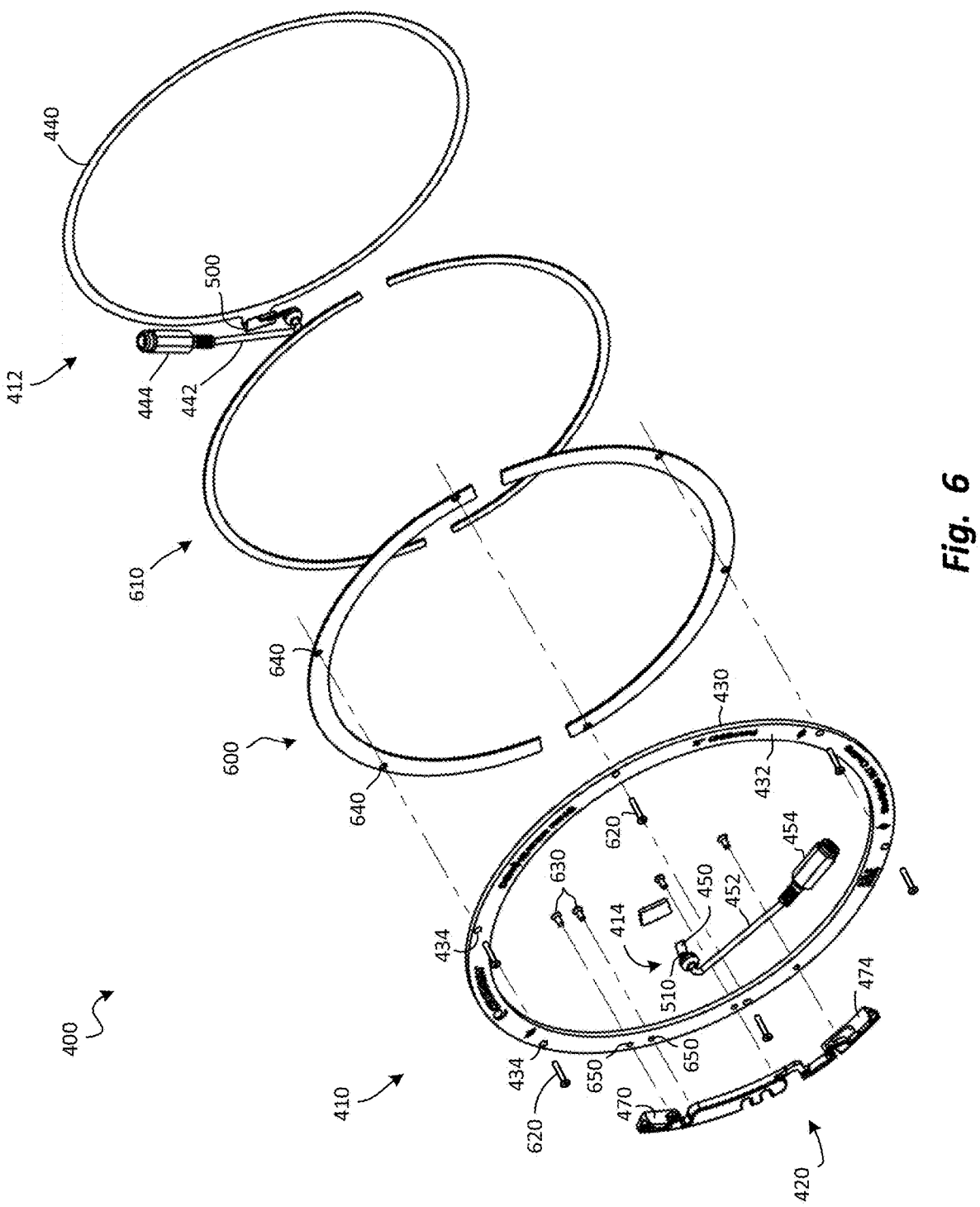
FIG. 6 is an exploded, perspective view of the lens heating system of FIG. 4.

FIG. 6 is an exploded, perspective view of the system 400 of FIG. 4, with the power source 416 and controller 418 omitted. As shown, a first gasket 600 and a second gasket 610 may optionally be sandwiched be- tween the ring 410 and the heating ring 440. The first gasket 600 and the second gasket 610 may help to cushion and/or protect the heating ring 440 and/or the periphery of the lens 300 and/or ensure a tight fit between the ring 410, the heating ring 440, and the body 120. The first gasket 600 and/or the second gasket 610 may further provide electrical insulation between the heating ring 440 and the ring 410. The first gasket 600 and/or the second gasket 610 may be formed of resilient and/or electrically insulative materials such as silicon rubber. In some embodiments, the first gasket 600 may cover the entire width of the ring 410 and may provide a cushion for the mounting surface 430 of the ring 410. The second gasket 610 may reside under only the portion of the ring 410 occupied by the heating element 412 in order to ensure that the heating element 412 is raised sufficiently to make contact with the lens 300.

As shown, the system 400 may also include a plurality of telescope attachment fasteners 620 that secure the ring 410, and thence the heating ring 440, the first gasket 600, and the second gasket 610, to the body 120 of the telescope 110. The telescope attachment fasteners 620 may be screws, and may be designed for insertion into and threaded engagement with corresponding threaded holes (not shown) in the body 120 of the telescope 110, distributed about the periphery of the lens 300. In some embodiments, the telescope attachment fasteners 620 may be the same screws originally used to secure the lens retaining ring 320 to the body 120.

The telescope attachment fasteners 620 may be inserted through the fastener holes 434 distributed about the periphery of the ring 410. Further, the telescope attachment fasteners 620 may be inserted through fastener holes 640 distributed about the periphery of the first gasket 600. As shown, the second gasket 610 may be thinner than the first gasket 600, like the heating ring 440, and may thus overlap only the interior portion of the mounting surface 430 of the ring 410. Thus, the second gasket 610 may not have fastener holes, as the telescope attachment fasteners 620 may be positioned beyond the outer circumference of the second gasket 610 and the heating ring 440.

The system 400 may also include a plurality of wire storage unit attachment fasteners 630 that can be used to secure the wire storage unit 420 to the outward-facing surface 432 of the ring 410. The wire storage unit attachment fasteners 630 may be inserted through fastener holes 650 formed in the ring 410. Unlike the fastener holes 434, the fastener holes 650 may be distributed along only the sectorial portion of the ring 410 that will be covered by the wire storage unit 420. The wire storage unit attachment fasteners 630 may be inserted through the fastener holes 650 and into corresponding threaded holes (not shown) formed in the underside of the wire storage unit 420.

As further shown in FIG. 6, the power wire 442 may be secured to the tab 500 of the heating element 412, and the temperature sensor wire 452 may be secured to the tab 510 of the temperature sensor 414. The wire storage unit 420 may have notches that allow the power wire 442 and the temperature sensor wire 452 to pass through the wire storage unit 420 so that they are accessible to the user and so that the power jack 444 can be inserted into the power jack receiver 470, and the temperature sensor jack 454 can be inserted into the temperature sensor jack receiver 474.

Figure 7:
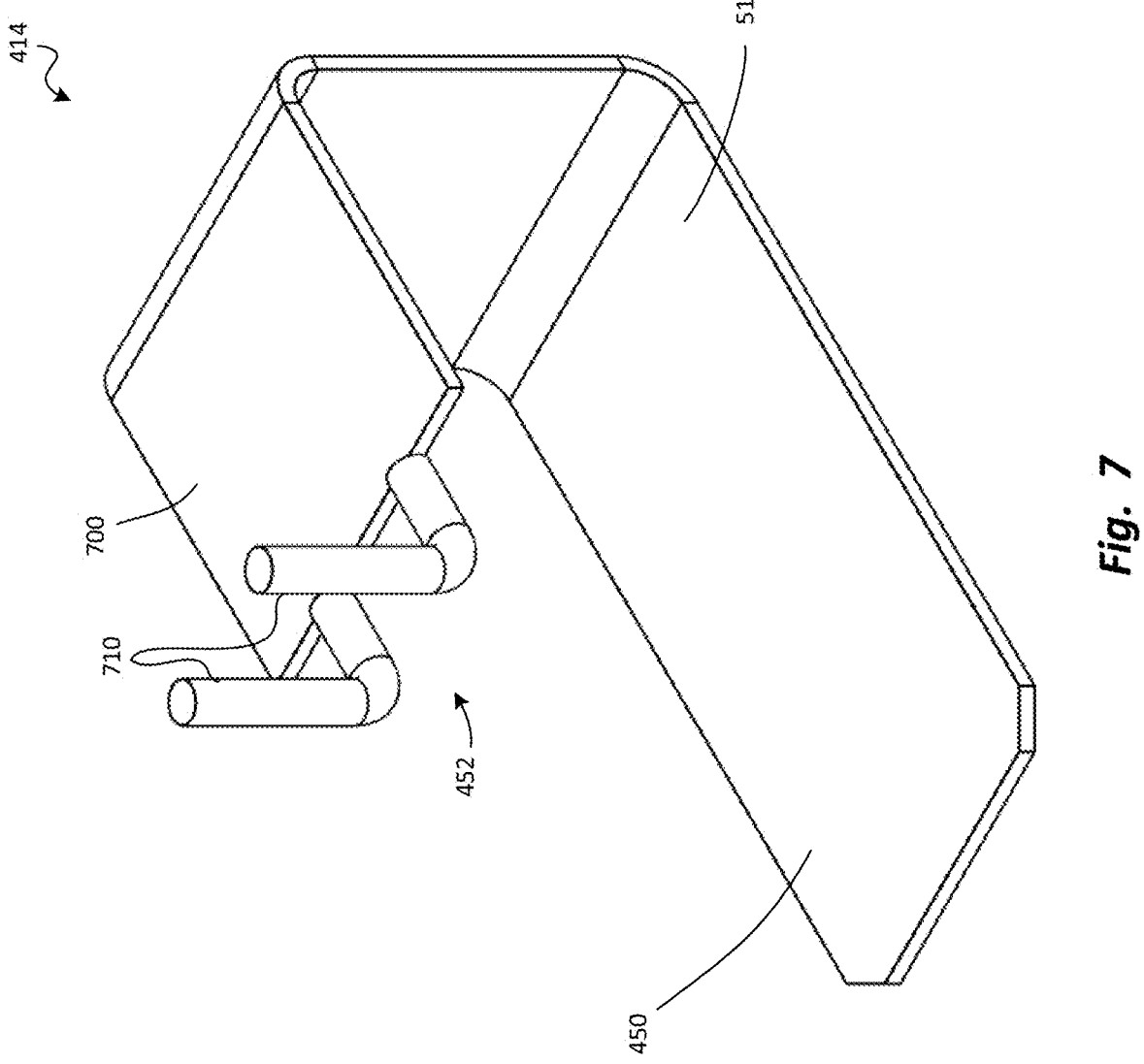
FIG. 7 is a perspective view of the temperature sensor of the lens heating system of FIG. 4.

FIG. 7 is a perspective view of the temperature sensor 414 of the system 400 of FIG. 4. As shown, the tab 510 may bend around the periphery of the ring 410 (not shown in FIG. 7) to connect the temperature sensing element 450 to a wire attachment portion 700. The temperature sensor wire 452 may include multiple wires, such as positive and negative wires 710, which may be soldered and/or otherwise secured to the wire attachment portion 700. In some embodiments, the tab 510 and/or the temperature sensing element 450 may be electrically and/or thermally insulated from the heating ring 440 by the first gasket 600, the second gasket 610, and/or another insulative element placed adjacent to the temperature sensing element 450 and/or the tab 510.

Figure 8:
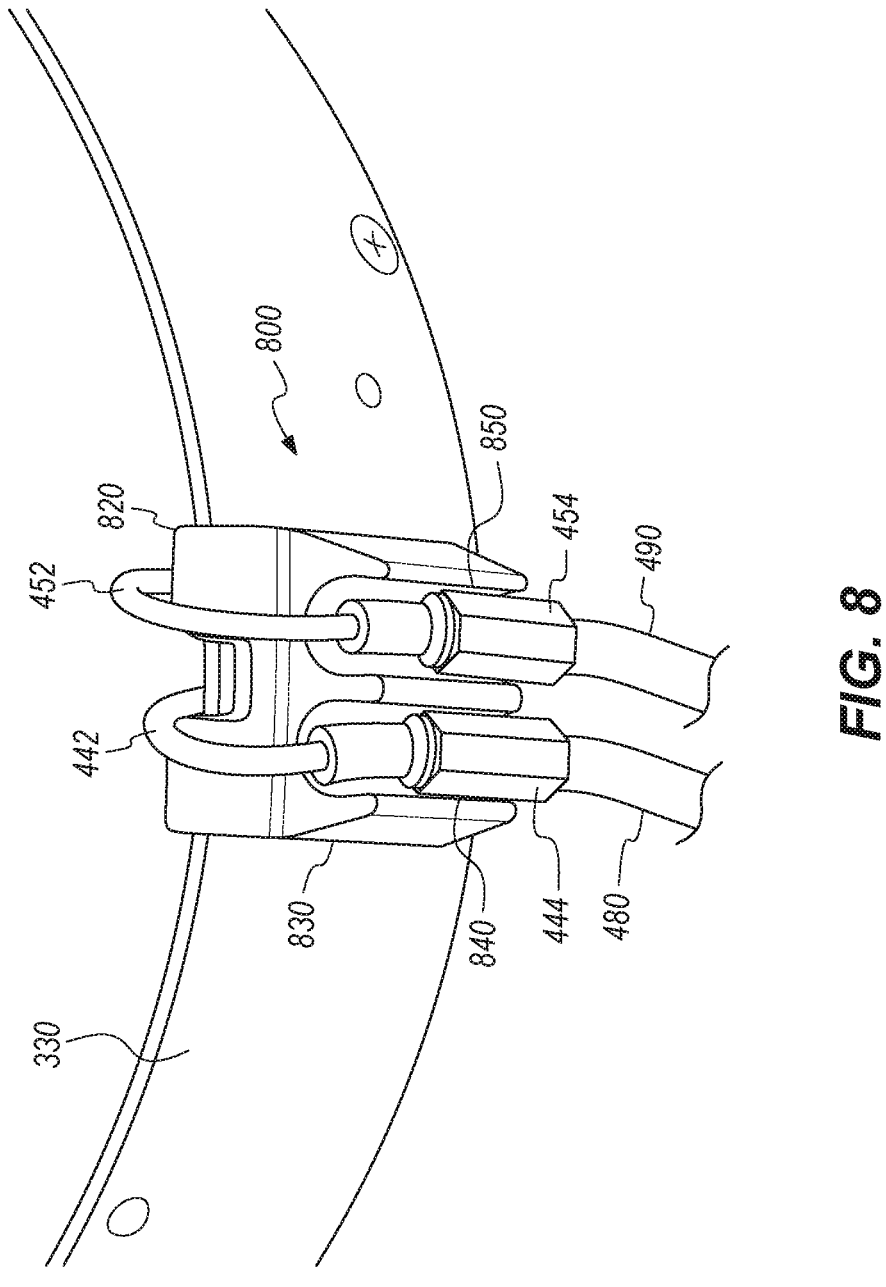
FIG. 8 is a perspective view of a wire management unit that may be included in the lens heating system of FIG. 4, according to one embodiment.

FIG. 8 is a perspective view of a wire management unit 800 that may be included in the system 400 of FIG. 4, according to one embodiment. As mentioned previously, the wire storage unit 420 may optionally maintain the power jack 444 and the temperature sensor jack 454 in positions such that they can be accessed and receive connections without removal of the power jack 444 and the temperature sensor jack 454 from the wire storage unit 420. However, it may be advantageous to remove the power jack 444 and/or the temperature sensor jack 454 from the wire storage unit 420 during use of the telescope 110 in order to ensure that the power wire 480 and/or the temperature sensor wire 490 remain outside the field of view of the telescope 110.

The wire management unit 800 may be used to accomplish this by facilitating attachment of the power jack 444 and the temperature sensor jack 454 to the power wire 480 and the temperature sensor wire 490 outside the light shield 330. The wire management unit 800 may be securable to the light shield 330, and may lie on the exterior of the light shield 330 to retain the power jack 444 and/or the temperature sensor jack 454, thus keeping the power wire 480 and/or the temperature sensor wire 490 outside the light shield 330 and out of the optical pathway of the telescope 110.

The wire management unit 800 may be formed as a single piece, and may have a gripper 820, a body 830, a power jack receiver 840, and a temperature jack receiver 850. The body 830 may have a generally planar shape, with an optional slight arc to accommodate the arc of the exterior wall of the light shield 330. The gripper 820 may have an arm that grips the edge of the light shield 330 of the telescope 110 against the body 830.

The arm may have a low profile such that the gripper 820 does not protrude significantly into the optical path of the telescope 110. Further, the power wire 442 and the temperature sensor wire 452 may be sufficiently short that, when the power jack 444 and the temperature sensor jack 454 are secured to the wire management unit 800, little slack remains in the power wire 442 and the temperature sensor wire 452, so that the power wire 442 and the temperature sensor wire 452 also remain outside the optical pathway of the telescope 110.

The power jack receiver 840 and the temperature jack receiver 850 may be positioned on the body 830, and may be used to secure and/or retain the power jack 444 and/or the temperature sensor jack 454. The user may simply remove the power jack 444 and the temperature sensor jack 454 from the power jack receiver 470 and the temperature sensor jack receiver 474, respectively, and then insert them into the power jack receiver 840 and the temperature jack receiver 850, respectively.

Like the power jack receiver 470 and the temperature sensor jack receiver 474, the power jack receiver 840 and the temperature jack receiver 850 may each take the form of a recess formed in the body 830. The recess may have a clip in the form of an arm that can flex outward to permit placement of the power jack 444 or the temperature sensor jack 454 in the recess, and then snap into place to capture the power jack 444 or the temperature sensor jack 454.

With the power jack 444 and the temperature sensor jack 454 in place in the power jack receiver 840 and the temperature jack receiver 850, respectively, the power wire 480 and the temperature sensor wire 490 may be coupled to the power jack 444 and the temperature sensor jack 454, respectively, in a manner that maintains the power wire 480 and the temperature sensor wire 490 outside the light shield 330, and also keeps the power wire 442 and the temperature sensor wire 452 generally within the light shield 330, but close enough to the light shield 330 to remain outside the optical pathway of the telescope 110.

The above description and referenced drawings set forth particular details with respect to possible embodiments. Those of skill in the art will appreciate that the techniques described herein may be practiced in other embodiments. First, the particular naming of the components or capitalization of terms is not mandatory or significant, and the mechanisms that implement the techniques described herein may have different names, formats, or protocols. Also, the particular division of functionality between the various system components described herein is merely exemplary, and not mandatory; functions performed by a single system component may instead be performed by multiple components, and functions performed by multiple components may instead be performed by a single component.

Reference in the specification to "one embodiment" or to "an embodiment" means that a particular feature, structure, or characteristic described in connection with the embodiments is included in at least one embodiment. The appearances of the phrase "in one embodiment" in various places in the specification are not necessarily all referring to the same embodiment.

While a limited number of embodiments has been described herein, those skilled in the art, having benefit of the above description, will appreciate that other embodiments may be devised which do not depart from the scope of the claims. In addition, it should be noted that the language used in the specification has been principally selected for readability and instructional purposes, and may not have been selected to delineate or circumscribe the inventive subject matter. Accordingly, the disclosure is intended to be illustrative, but not limiting.

What is claimed is:

1. A system for heating a lens of an optical device, the system comprising:
   a lens retaining ring configured to secure the lens to a body of the optical device, the lens retaining ring comprising a mounting surface configured to be mounted on the lens with the mounting surface facing a top or bottom surface of the lens; and
   a heating element attached to the mounting surface such that, with the mounting surface mounted on the lens, the heating element is proximate the lens such that heat generated by the heating element prevents dew formation on the lens.

2. The system of claim 1, wherein the mounting surface is ring-shaped and defines a central aperture through which light can pass to reach the lens.

3. The system of claim 2, wherein the lens retaining ring keeps the lens in position relative to the body of the optical device such that the heating element does not occlude the central aperture.

4. The system of claim 2, further comprising:
   electrical wiring coupled to the heating element to convey electrical energy to the heating element; and
   a wire storage unit secured relative to the mounting surface, wherein the wire storage unit is configured to retain the electrical wiring such that the electrical wiring does not occlude the central aperture and does not interfere with attachment of a cover to the body of the optical device to cover the lens.

5. The system of claim 2, further comprising:
   electrical wiring coupled to the heating element to convey electrical energy to the heating element; and
   a wire management unit configured to be coupled to the body of the optical device to facilitate routing of the electrical wiring to a power source.

6. The system of claim 2, further comprising a temperature sensor secured relative to the mounting surface such that, with the mounting surface mounted on the lens, the temperature sensor is positioned on the lens such that the temperature sensor does not occlude the central aperture and provides sensor data indicative of a temperature of the lens.

7. The system of claim 6, further comprising:
   electrical wiring coupled to the temperature sensor to convey the sensor data to a controller; and
   a wire storage unit secured relative to the mounting surface, wherein the wire storage unit is configured to retain the electrical wiring such that the electrical wiring does not occlude the central aperture and does not interfere with attachment of a cover to the body of the optical device to cover the lens.

8. The system of claim 6, further comprising a controller configured to receive the sensor data.

9. The system of claim 8, further comprising a power source operatively connected to the controller such that the heating element is automatically powered to heat the lens in response to indication, by the sensor data, that a temperature of the lens is below a predetermined threshold.

10. A system for heating a lens of an optical device, the system comprising:
   a lens retaining ring configured to secure the lens to a body of the optical device, the lens retaining ring comprising a mounting surface configured to be mounted to a body of the optical device such that the system does not interfere with attachment of a cover to the body to cover the lens and, with the cover attached, the lens retaining ring is between the cover and the lens and the mounting surface faces a top or bottom surface of the lens; and
   a heating element attached to the mounting surface that, with the mounting surface mounted to the body, is proximate the lens such that heat generated by the heating element prevents dew formation on the lens.

11. The system of claim 10, wherein the mounting surface is ring-shaped and defines a central aperture through which light can pass to reach the lens;
   and wherein the lens retaining ring keeps the lens in position relative to the body of the optical device such that the heating element does not occlude the central aperture.

12. The system of claim 11, further comprising:
   electrical wiring coupled to the heating element to convey electrical energy to the heating element; and
   a wire storage unit secured relative to the mounting surface, wherein the wire storage unit is configured to retain the electrical wiring such that the electrical wiring does not occlude the central aperture and does not interfere with attachment of the cover to the body to cover the lens.

13. The system of claim 11, further comprising:
   electrical wiring coupled to the heating element to convey electrical energy to the heating element; and
   a wire management unit configured to be coupled to the body of the optical device to facilitate routing of the electrical wiring to a power source.

14. The system of claim 10, further comprising a temperature sensor secured relative to the mounting surface such that, with the mounting surface mounted on the lens, the temperature sensor is positioned on the lens such that the temperature sensor does not occlude the central aperture and provides sensor data indicative of a temperature of the lens.

15. The system of claim 14, further comprising:
   a controller configured to receive the sensor data; and
   a power source operatively connected to the controller such that the heating element is automatically powered to heat the lens in response to indication, by the sensor data, that a temperature of the lens is below a predetermined threshold.

16. A system for heating a lens of an optical device, the system comprising:
   a lens retaining ring configured to secure the lens to a body of the optical device, the lens retaining ring comprising a mounting surface configured to be mounted on a top or bottom surface of the lens;

a heating element attached to the mounting surface such that, with the mounting surface mounted on the lens, the heating element is proximate the lens such that heat generated by the heating element prevents dew formation on the lens; and a temperature sensor secured relative to the mounting surface such that, with the mounting surface mounted on the lens, the temperature sensor is positioned on the lens such that the temperature sensor does not occlude the central aperture and provides sensor data indicative of a temperature of the lens.

17. The system of claim 16, wherein the mounting surface is ring-shaped and defines a central aperture through which light can pass to reach the lens;

and wherein the lens retaining ring keeps the lens in position relative to the body of the optical device such that the heating element does not occlude the central aperture.

18. The system of claim 17, further comprising:

first electrical wiring coupled to the heating element to convey electrical energy to the heating element;

second electrical wiring coupled to the temperature sensor to convey the sensor data to a controller; and a wire storage unit secured relative to the mounting surface, wherein the wire storage unit is configured to retain the first electrical wiring and the second electrical wiring such that the first electrical wiring and the second electrical wiring do not occlude the central aperture and do not interfere with attachment of a cover to the body of the optical device to cover the lens.

19. The system of claim 17, further comprising:

electrical wiring coupled to the heating element to convey electrical energy to the heating element; and a wire management unit configured to be coupled to the body of the optical device to facilitate routing of the electrical wiring to a power source.

20. The system of claim 16, further comprising:

a controller configured to receive the sensor data; and a power source operatively connected to the controller such that the heating element is automatically powered to heat the lens in response to indication, by the sensor data, that a temperature of the lens is below a predetermined threshold.

\* \* \* \* \*